Nov. 11, 1952     H. F. MARTIN     2,617,365
TRACTOR FOR USE IN TRANSPORTATION OF A LOAD
Filed Feb. 25, 1947     3 Sheets-Sheet 1
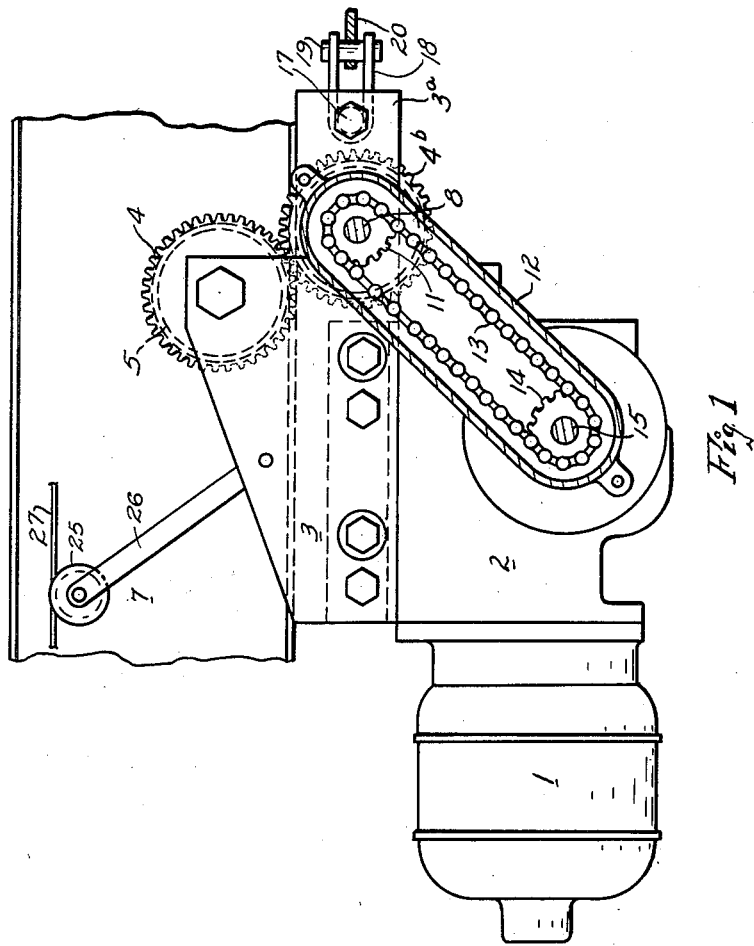
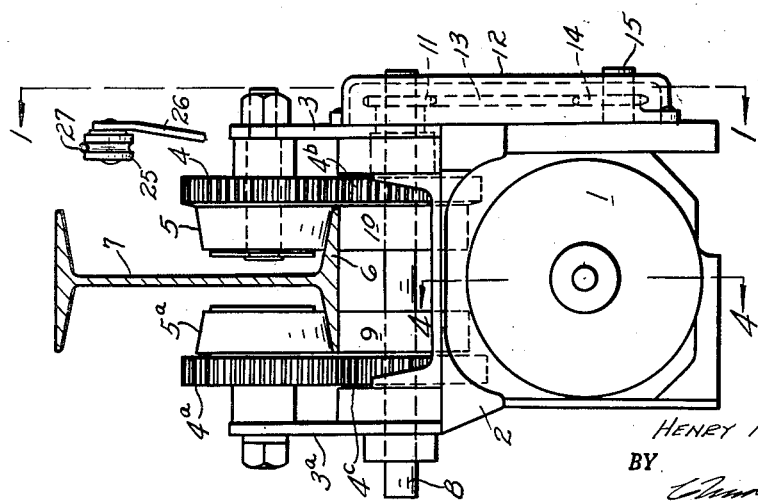
INVENTOR.
HENRY F. MARTIN
BY
ATTORNEY.

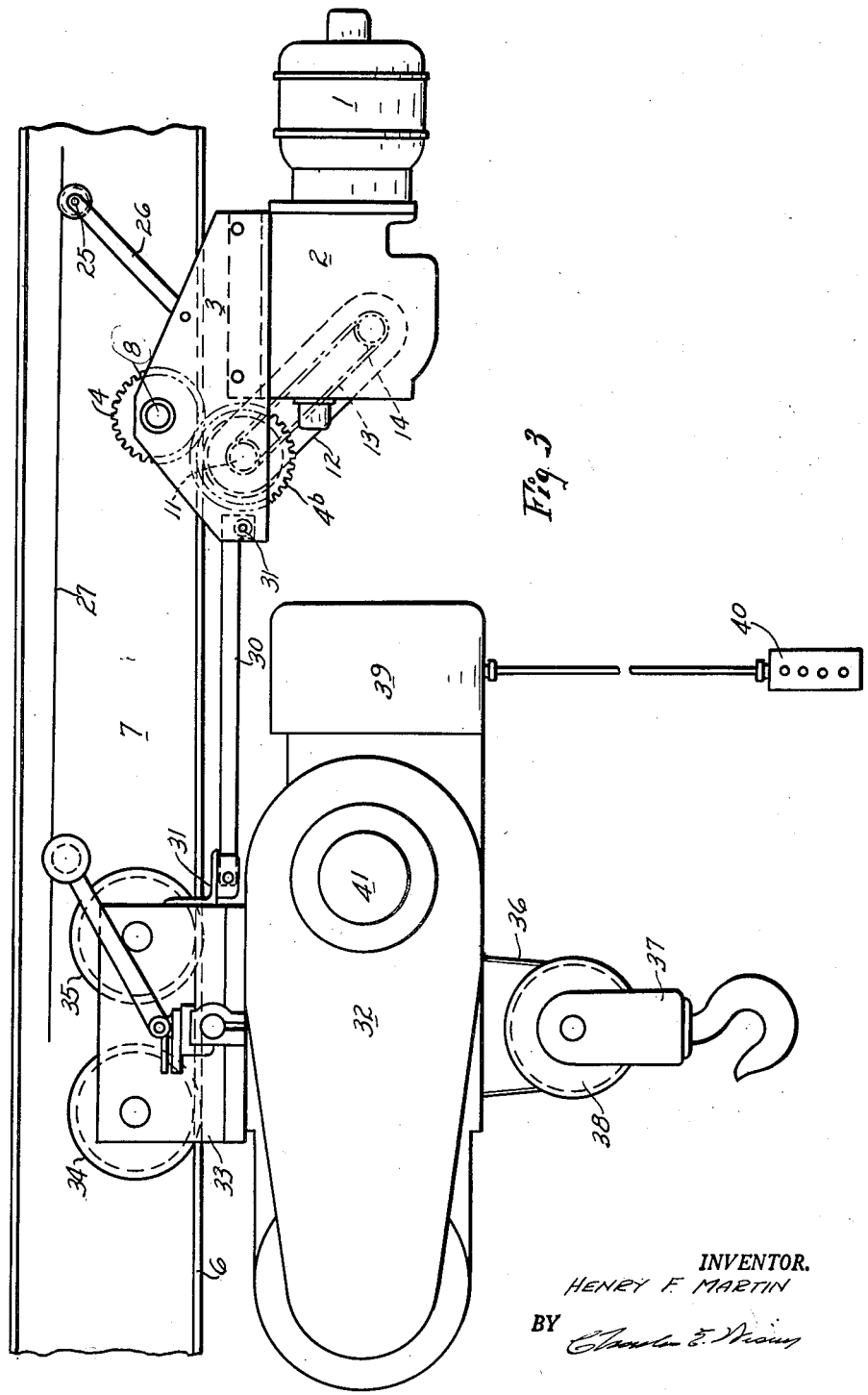

Nov. 11, 1952     H. F. MARTIN     2,617,365
TRACTOR FOR USE IN TRANSPORTATION OF A LOAD
Filed Feb. 25, 1947     3 Sheets-Sheet 3

INVENTOR.
HENRY F. MARTIN
BY
ATTORNEY.

Patented Nov. 11, 1952

2,617,365

UNITED STATES PATENT OFFICE 2,617,365

TRACTOR FOR USE IN TRANSPORTATION OF A LOAD

Henry F. Martin, Centerline, Mich., assignor to Detroit Hoist and Machine Company, Detroit, Mich., a corporation of Michigan Application February 25, 1947, Serial No. 730,723

4 Claims. (Cl. 105—153)

This invention relates to tractors for use in transportation of a load along a horizontal rail and is particularly useful in manufacturing plants for transportation of material from one portion of a plant to another or to the exterior of the plant. The tractor is adapted for use in conjunction with a hoist of a character to pick up a load and transfer the same along the rail from one point to another in a manufacturing plant.

The tractor unit is of such character that in traversing a horizontally positioned beam the rotary elements are maintained in pressure engagement with opposite surfaces of the beam.

These and other features and objects of the invention are hereinafter more fully described and claimed and a tractor embodying my invention is shown in the accompanying drawing in which—

Fig. 1 is a side elevation of my improved tractor supported on the lower flange of an I beam, being a section taken on line 1—1 of Fig. 2.

Fig. 2 is an elevation taken from the left side of Fig. 1.

Fig. 3 is an elevation showing the tractor connected with a load carrying element and movable along an I beam.

Figure 4:
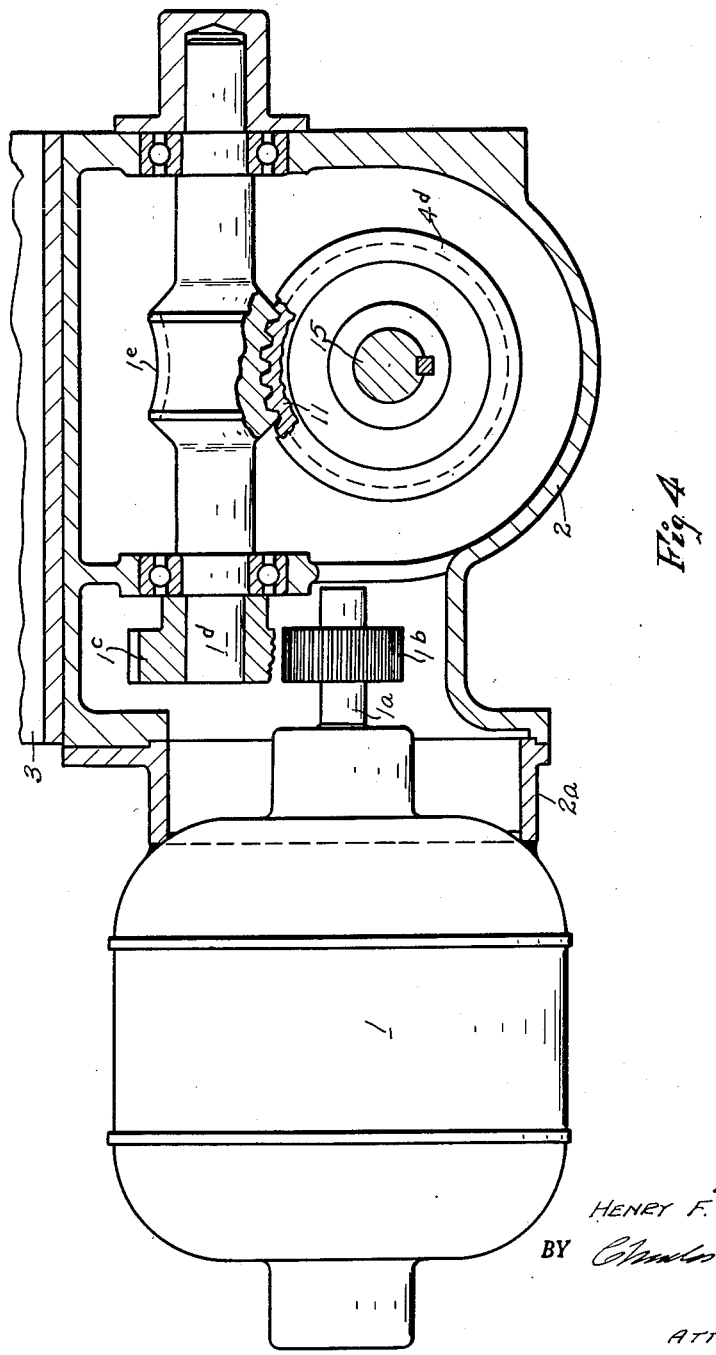
Fig. 4 is a section taken on line 4—4 of Fig. 2 showing the mechanism with which the motor is associated and by means of which the load carrying unit may be moved along a beam.

In the drawings the motor is indicated at 1 and is attached at one end to the casing 2 and the outer end of the motor casing is preferably welded, or otherwise attached, to the outer edge of the casing 2 as shown in Fig. 4. The inner face of the casing 2 is secured to the ring like element 2a, the outer periphery of which is welded to one end of the motor. Within casing 2 is a gear 1b on the motor shaft 1a which meshes with the gear 1c on the shaft 1d. On the shaft 1d is a worm gear 1e engaging the gear 1f on the shaft 15. The gear 1f has a casing 4d about its periphery as shown in Fig. 4. On actuation of the motor the shaft 15 is rotated and on the shaft is a sprocket 14 and, by means of the chain 13 and sprocket 11, the shaft 8 for the gear 4b is rotated. The gear 4b meshes with the gear 4 supported by the plate 3 on one side of the rail 7. There are similar gears 4 and 4a which are in mesh with the gears 4b and 4c on the shaft 8. On the inner face of the gears 4 and 4a are secured ring like members 5 and 5a having the form of a truncated cone which ride the upper surface of the lower flange of the I beam or rail as shown in Fig. 2. The gear 4 and its shaft are supported by the plate 3 and the gear 4a and its shaft are supported by the plate 3a as shown in Fig. 2. Drive wheels 10 and 9, preferably secured respectively to gears 4b and 4c for rotation therewith, operatively engage the under surface of the flange 6 of rail 7. Drive wheels 5 and 5a engage the top surface of flange 6, and in cooperation with wheels 9 and 10 cause movement of the tractor assembly along said rail or I beam. The trolley wheel 25 is pivotally mounted on arm 26 and the latter is pivotally joined to the plate 3 as indicated in Fig. 1 and rides the wire 27 connected with a source of current supply for energizing motor 1.

While not shown there is a motor in the casing 32 and means including gears by means of which the cable 36 may be wound or unwound from a reel in the casing 32 to raise or lower the hook element 37 which has a grooved wheel 38 to receive the cable. Upon closing the circuit to a motor (not shown) in the casing 32 by the switch element 40 the motor in casing 32 is energized and drives the reel shaft 41. Thus, when the load has been carried by the hoist mechanism to the desired position in the plant through actuation of the motor 1, the load carried by the hook element 37 may be deposited or picked up and moved along the rail.

As shown in Fig. 3 the motor and gear unit has tow bar 30 pivotally secured at 31 to the supporting plate 3 and the opposite end of the arm is attached to the bracket 31 secured to the framework of the hoist in the casing 32 which includes a bracket 33. A second bracket is arranged on the opposite side of the rail and the rollers 34 and 35 are each carried by the brackets 33 and engage the upper surface of a lower flange of the rail, as will be understood from Fig. 3.

Motor 1 of Fig. 1 is arranged forwardly of wheels 5 and 5a, or forwardly of a vertical plane through shaft 8 so that said motor as well as casing 2 and plates 3 and 3a will have a tendency to rotate in a counterclockwise direction as viewed in Fig. 1 about the axis of shaft 8. This provides an increased traction for the wheels 5, 5a, 9 and 10 with respect to the corresponding surfaces of the rail 7.

It is believed obvious from the foregoing description that the tractor is adapted to move a load along a rail. In Fig. 3 the load is the hoist mechanism and material supported by the hook 37. The basic feature of the invention resides in the tractor element whereby a load may be carried on an overhead rail.

Having described my invention, its utility and mode of operation, what I claim and desire to secure by Letters Patent of the United States is—

1. In a tractor for use in transporting a load along a rail, a motor, a supporting casing joined thereto, transmission mechanism within said casing driven by the motor including a shaft driven thereby spaced below said rail and at right angles thereto, a gear secured on said shaft, a second gear journalled on said casing meshing with said first gear, a drive wheel secured on said shaft operatively engaging the under surface of said rail, a second drive wheel on the second gear operatively engaging the top surface of said rail, said wheels cooperating to propel said casing along said rail, the second gear being rearwardly of the first gear whereby the weight of the motor and casing with respect to said shaft maintains said drive wheels in pressure contact with opposed surfaces of the rail.

2. A tractor for use in transporting a load along a rail comprising a motor, a casing joined at one end to one end of said motor, and movably supported and suspended at its other end from said rail, a motor shaft extending into the casing, a second shaft journalled in said casing parallel to said motor shaft and driven thereby, a worm on said second shaft, a third shaft journalled in the casing projecting therefrom and positioned at right angles to said second shaft, a worm gear on the third shaft meshing with said worm, a sprocket on the outer end of said third shaft, a fourth shaft journalled by said casing, extending therefrom and parallel to said third shaft, a sprocket on said fourth shaft connected with said first sprocket whereby rotation of the motor shaft rotates said fourth shaft, a first gear on said fourth shaft, a drive wheel on said fourth shaft operatively engaging the under surface of said rail, a second gear journalled on said casing rearwardly of said first gear and in mesh therewith, a second drive wheel on said second gear bearing upon and operatively engaging the top surface of said rail, said drive wheels cooperating to propel said motor and casing along said rail, the weight of said motor and casing with respect to said fourth shaft maintaining an increased traction between said rail and drive wheels.

3. A tractor for use in transporting a load along a beam having a flange positioned in a horizontal plane, comprising a motor including a drive shaft, a casing secured at one end of the motor including a pair of plates in parallel spaced relation upon opposite sides of said flange, a second shaft journalled upon said plates at right angles to said motor shaft and arranged below said rail, means operatively connecting said shafts, spaced gears secured upon said second shaft, spaced drive wheels secured on said second shaft between said gears and operatively engaging the under surface of said flange, a gear rotatably supported on each plate, drive wheels secured to said latter gears and riding upon the upper surface of said flange on its opposite sides, the last named gears having their axis rearwardly of the axis of said first spaced gears whereby the weight of the motor and casing with respect to said second shaft tends to maintain the drive wheels in pressure contact with the respective surfaces of said flange.

4. A tractor for use in transporting a load along a rail having a flange in a horizontal plane, comprising a motor, a casing therefor, a motor shaft extending into the casing, a second shaft journalled in the casing parallel to and driven by said motor shaft, a worm on the second shaft, a third shaft journalled in the casing at right angles to said second shaft, a worm gear on the third shaft meshing with said worm, the third shaft extending to the exterior of the casing, a fourth shaft rotatably supported by the casing parallel to said third shaft, means interconnecting said third and fourth shafts, drive wheels secured on the fourth shaft operatively engaging the under surface of said flange, a gear secured to each drive wheel and mounted on said fourth shaft, a second pair of gears rotatably supported by the casing and meshing respectively with the gears on said fourth shaft, said second pair of gears each having an inwardly projecting circular flange operatively engaging the upper surface of said rail flange, said second pair of gears being supported at a point on the motor side of a vertical plane passing through said fourth shaft, whereby the weight of the motor and casing with respect to said fourth shaft maintains the drive wheels and said circular flanges in pressure engagement with the respective surfaces of said rail flange.

HENRY F. MARTIN.

REFERENCES CITED

The following references are of record in the file of this patent:

UNITED STATES PATENTS

| Number | Name | Date |
|---|---|---|
| 792,675 | Springer | June 20, 1905 |
| 1,733,069 | Naud et al. | Oct. 22, 1929 |
| 1,759,177 | Wehr | May 20, 1930 |
| 1,850,048 | Ballew | Mar. 15, 1932 |
| 1,960,860 | Allen | May 29, 1934 |
| 2,057,850 | Sims | Oct. 20, 1936 |
| 2,168,986 | Harris | Aug. 8, 1939 |
| 2,204,638 | Weathers | June 18, 1940 |
| 2,317,689 | Medenwald | Apr. 27, 1943 |

FOREIGN PATENTS

| Number | Country | Date |
|---|---|---|
| 499,611 | France | Nov. 24, 1919 |
| 432,859 | Germany | Aug. 14, 1926 |
| 357,283 | Italy | Mar. 9, 1938 |